United States Patent [19]

Ebata et al.

[11] 4,293,356

[45] Oct. 6, 1981

[54] METHOD FOR ADHESION OF CERAMICS

[75] Inventors: Yoshihiro Ebata, Kawanishi; Yasuo Toibana, Ikeda; Tsuneo Uetsuki, Kawanishi; Saburo Kose; Makoto Kinoshita, both of Ikeda, all of Japan

[73] Assignees: Agency of Industrial Science & Technology; Ministry of International Trade & Industry, both of Tokyo, Japan

[21] Appl. No.: 143,758

[22] Filed: Apr. 25, 1980

Related U.S. Application Data

[62] Division of Ser. No. 87,064, Oct. 22, 1979, Pat. No. 4,269,641.

[30] Foreign Application Priority Data

Nov. 10, 1978 [JP] Japan ................................. 53-138991
Dec. 1, 1978 [JP] Japan ................................. 53-149421

[51] Int. Cl.$^3$ ........................ B32B 31/12; C04B 39/12
[52] U.S. Cl. ..................................... 156/89; 501/133; 501/152; 501/154

[58] Field of Search .................. 156/89; 106/39.5, 69, 106/73.2, 73.5; 427/229, 330, 374.7, 376.3, 376.4, 383.5, 383.7, 383.9, 405, 419.4, 419.2; 428/428, 432, 433, 457, 472

[56] References Cited

U.S. PATENT DOCUMENTS 3,993,844  11/1976  Kiger et al. ........................ 106/73.2
4,076,991  2/1978   Datta ................................. 106/73.2
4,090,881  5/1978   Keel et al. ............................ 106/69
4,156,661  5/1979   Brodmann et al. ................. 106/73.2
4,163,074  7/1979   Ebata et al. ...................... 427/376.3

Primary Examiner—Caleb Weston
Attorney, Agent, or Firm—Kurt Kelman

[57] ABSTRACT

A method for providing strong adhesion of two ceramic articles to each other or one ceramic article to an article of metallic copper, which method comprises applying, in the former adhesion, a powder mixture of CuS-LaCrO$_3$-SiO$_2$-Cu to the opposed surfaces of the two ceramic articles or, in the latter adhesion, a powder mixture of CuS-LaCrO$_3$-SiO$_2$ to the opposed surfaces of the ceramic article and the article of metallic copper and, thereafter, heating the pair of articles in the air at a temperature of from 1000° to 1200° C.

6 Claims, No Drawings

METHOD FOR ADHESION OF CERAMICS

This is a division of application Ser. No. 87,064, filed Oct. 22, 1979.

BACKGROUND OF THE INVENTION

This invention relates to a method for the adhesion of two ceramic articles to each other.

Recently, ceramics have come to attract special attention for their outstanding refractoriness. In consequence of the increasing adoption of ceramics in various industries, a great need is felt for the development of a reliable and simple method for joining two ceramic articles to each other or one ceramic article to an article of metallic material.

Various methods have heretofore been proposed for the adhesion of metallic materials to ceramic articles. Examples are the Telefunken method, activated metal method, hydrogen compound method, metal oxide method, powder compression method, hot press method, solder glass method, glaze and metal powder method, and copper oxide method. These methods, however, share a serious disadvantage in that their heating treatments must be performed either under a vacuum or in a reducing atmosphere.

Of the aforementioned methods, the solder glass method uses a soldering agent comprised of glass and an oxide and accomplishes the adhesion of a ceramic article to an article of metallic material by interposing the soldering material between the opposed surfaces of the two articles and heating the articles until their opposed surfaces are caused to adhere fast to each other by virtue of the fusion of the soldering material. According to this method, the heat treatment is generally carried out in the air at a relatively low temperature or in an inert gas or a vacuum at a high temperature. The use of an inert gas for high-temperature heat treatment is for the purpose of preventing the metallic material from oxidation. This method enjoys the advantage that the heat treatment can be effectively performed in the air when low temperatures suffice for the purpose of the treatment. However, since this method uses a low-melting PbO glass as one of the components of the soldering agent, the products joined by this method can endure heat up to 300° to 400° C. at most. Further, during the actual use of these products, the soldering materials exhibit poor chemical durability. When this method is effected by use of a soldering material containing a high-melting glass, the temperature of the heat treatment is inevitably elevated beyond 1000° C. Consequently, the heat treatment must be carried out in a neutral gas or under a vacuum in order to preclude the possible oxidation of the metallic material.

One of the present inventors has proposed a method (Japanese Patent Publication No. 21569/1972) for applying a thin layer of silver to the surface of a ceramic article by the steps of coating the surface of the ceramic article with a mixture of copper with kaolin, heating the coated ceramic article in an oxidizing atmosphere kept at a temperature of not less than 900° C. and, thereafter, spraying the hot surface of the ceramic article with silver carbonate while the article is kept heated at a temperature of not less than 700° C. This method produces a thin layer of silver sticking with high adhesive strength to the surface of the ceramic article. In the case of a ceramic article of the nitride type, however, this method fails to provide reliable adhesion of the silver layer to the surface of the ceramic article. With a view to overcoming this weak point, the present inventors studied and tested this method elaborately. They have, consequently, developed and proposed a method (U.S. Pat. No. 4,163,074) which provides effective adhesion of metallic materials even to nitride type ceramic articles by causing the heat treatment which, in the aforementioned method, is performed in the oxidizing atmosphere to be carried out in a nitriding atmosphere instead.

The two methods of adhesion described above, however, are required each to give two heat treatments to each pair of articles being joined, with the heat treatments performed in special atmospheres. These methods permit adhesion of two ceramic articles to be effected by having the whole procedure carried through twice, i.e. once each for the two opposed surfaces of the articles. Thus, this adhesion necessitates a complicated operation.

An object of this invention is to provide a method for strongly joining two ceramic articles to each other by subjecting the articles to only one heat treatment performed in an oxidizing atmosphere, namely, in the air.

SUMMARY OF THE INVENTION

To accomplish the object described above according to the present invention, there is provided a method for the adhesion of two ceramic articles to each other, which method comprises interposing, a powder mixture of $CuS$-$LaCrO_3$-$SiO_2$-$Cu$ between the opposed surfaces of the two ceramic articles and, thereafter, heating the pair of articles in the air at a temperature of from 1000° to 1200° C. for a period of 10 to 20 minutes.

As described above, the method of this invention enables two ceramic articles to be joined to each other with an adhesive strength of 450 to 500 $kg/cm^2$ simply by interposing a powder mixture of $CuS$-$LaCrO_3$-$SiO_2$-$Cu$ between the opposed surfaces of the ceramic articles and heating the ceramic articles in the air. Since the adhesion is accomplished by such a simple operation, the present invention widens the range of application of ceramics in industry.

The other objects and characteristics of the present invention will become apparent from the further disclosure of the invention to be given hereinafter.

DESCRIPTION OF PREFERRED EMBODIMENT

The inventors continued a study in search of a method which enables a ceramic article and an article of metallic copper to stick with high adhesive strength to each other by only one heat treatment performed in the air. They have consequently found that reliable adhesion is obtained not only between a ceramic article and an article of metallic copper but also between two ceramic articles by use of an intermediate layer formed of a $CuS$-$LaCrO_3$-$SiO_2$ system. The present invention has issued from this knowledge.

To be specific, the method of this invention comprises mixing a $CuS$ powder, an $LaCrO_3$ powder and an $SiO_2$ powder, converting the resultant powder mixture into a paste by addition of an organic adhesive agent, applying the paste to the surface of a first ceramic article, either dusting the coat of paste on the surface of the first ceramic article with a copper powder or mixing copper powder into the paste before its application to the first ceramic article, pressing a second ceramic article onto the cost of paste spread on the first ceramic article and, thereafter, heating the articles in an oxidizing atmosphere at a temperature of from 1000° to 1200° C., whereby the two articles are joined strongly to each other.

The method of this invention is characterized by forming on the surface of a ceramic article an intermediate layer of a $CuS$-$LaCrO_3$-$SiO_2$ system prepared from a mixture of $CuS$, $LaCrO_3$ and $SiO_2$ powders. The intermediate layer of a ternary system formed of copper and a copper compound resulting from decomposition of copper sulfide, $LaCrO_3$ and $SiO_2$ is a low-melting compound having a melting point of about 1150° C. The compound is caused to permeate the ceramic article at a relatively low temperature (about 1100° C.).

The phenomenon described above represents an attribute peculiar to the ternary-system intermediate layer of this invention. $CuS$, when used alone, obtains absolutely no permeation into the ceramic article. The ternary system containing $CuS$ is allowed to permeate the ceramic article to give rise to the intermediate layer and impart heretofore unattainable high adhesive strength thereto. One of the reasons for the advantageous permeation of the ternary system into the ceramic article is the high reactivity of $LaCrO_3$ with $CuS$. When $LaCrO_3$ reacts with $CuS$ to give rise to the intermediate layer of the ternary system, the reaction proceeds with liberation of sulfur. Since sulfur is relatively active on ceramics, it serves to accelerate the permeation of the intermediate layer into the ceramic article.

Further, the sulfur which occurs during the aforementioned reaction induces a reducing activity, which notably weakens the oxidizing effect of the heat treatment on the metal.

The aforementioned acceleration of the permeation which is obtained with copper sulfide cannot be expected from use of any other copper compound such as, for example, $CuCO_3$ or $CuO$. Use of such other copper compound in the ternary system only results in the disadvantage that the permeation fails to proceed effectively, the oxidation of metal is not repressed satisfactorily and the adhesive strength is not produced to any appreciable extent. When $CuS$ and kaolin are used, there is obtained a ternary system similarly to the ternary system for the intermediate layer of this invention. This ternary system, however, fails to impart high adhesive strength.

An intermediate layer using $Al_2O_3$, $ZrO_2$ or $MgO$, for example, in the place of $SiO_2$ in the ternary system obtains some permeation into the ceramic article. This permeation is very small compared with obtainable by the intermediate layer of this invention and fails to provide reliable adhesion. It is only by use of the intermediate layer formed of the $CuS$-$LaCrO_3$-$SiO_2$ system that the intermediate layer produces effective strong adhesion. Substitution of other similar compounds for the components of the ternary system results in partial or total loss of the effective adhesion. The effectiveness of particular compounds as components in the ternary system cannot be determined without putting such compounds to actual test.

The method of this invention by which the adhesion is accomplished as aimed at will be described specifically below. First, a $CuS$ powder (80 to 90% by weight) and a combined $LaCrO_3$ and $SiO_2$ powder (10 to 20% by weight) are thoroughly mixed. The ratio of $LaCrO_3$ to $SiO_2$ in the latter combined powder is desired to fall in the range of from 25:75 to 50:50 by weight. The ternary-system powder to be used for this invention is desired to have a particle size of not greater than $1\mu$.

The desirability of adhesion obtained is improved in proportion as the purity of the ternary system increases. The fine powder mixture consequently obtained is further stirred to ensure homogeneous blending of the components. The homogeneous fine powder mixture can be applied directly to the surface of the ceramic article. Otherwise, the fine powder mixture may be kneaded with a proper binder or solvent such as, for example, balsam or printing ink and the resultant paste applied to the surface of the ceramic article in order to prevent the powder mixture from being blown away and from displacement by running of the powder and to ensure uniform application of the powder to the surface of the ceramic article. The amount of the ternary-system powder applied uniformly throughout the entire surface of the ceramic article may fall in the range of 2-4 $g/cm^2$.

When two ceramic articles are to be joined, desired adhesion is obtained by dusting the coat of powder mixture already applied to the surface of the first ceramic article with powdered copper or coating the surface of the first ceramic article from the beginning with a powder mixture containing powdered copper in addition to the components mentioned above, placing the second ceramic article in fast contact with the coat of powder spread on the surface of the first ceramic article and, thereafter, heating the two articles. The amount of the powdered copper to be applied by dusting or to be added is in the range of from 0.1 to 0.3 $g/cm^2$ of the surface of the ceramic article. The powdered copper is desired to have a particle size of not more than $10\mu$.

In either of the adhesions contemplated by this invention, the heat treatment is carried out in an oxidizing atmosphere, namely in the air, at a temperature of not lower than 1000° C. This heat treatment gives birth to an intermediate layer of the $CuS$-$LaCrO_3$-$SiO_2$ system.

In the adhesion of two ceramic articles to each other, the aforementioned heat treatment causes part of the intermediate layer to permeate both the ceramic articles, with the result that the two ceramic articles adhere strongly to each other through the medium of the intermediate layer. The adhesive strength obtained in this case increases with the increasing temperature of the heat treatment similarly to the adhesion with the article of metallic copper. The temperatures at which the heat treatment produces practical adhesive strength of the intermediate layer are in the range of from 1150° to 1200° C. The adhesive strength thus obtained falls in the neighborhood of 500 $kg/cm^2$.

When the heat treatment is given at a temperature of from 1000° to 1200° C. for a period of from 10 to 20 minutes, the powder mixture of the $CuS$-$LaCrO_3$-$SiO_2$ system is vitrified to provide effective adhesion between two ceramic articles. Carrying the heat treatment out at a higher temperature or for a longer period only results in the disadvantage that numerous air bubbles find their way into the vitrified intermediate layer possibly to the extent of appreciably impairing the adhesion aimed at.

When the powder mixture of the $CuS$-$LaCrO_3$-$SiO_2$ system is subjected to the heat treatment in the air, it produces a low-melting compound which makes the effective adhesion possible. When the heat treatment is carried out in a reducing atmosphere, the powder mixture does not produce the low-melting point and, consequently, fails to provide the effective adhesion aimed at. Particularly, the $CuS$ component of the powder mixture is credited with the generation of high adhesive strength. During the heat treatment, CuS undergoes decomposition with liberation of sulfur, which is active enough to corrode the surface layer of the ceramic article and, therefore, facilitate the passage of the aforementioned low-boiling compound of the ternary system into the ceramic article. Consequently, there can be formed an intermediate layer which exhibits high adhesive strength to the ceramic article.

As is clear from the foregoing description, the method of the present invention produces strong adhesion between two ceramic articles by interposing a powder mixture of $CuS-LaCrO_3-SiO_2$ between the opposed surfaces of the pair of ceramic articles upon addition of powdered copper and subjecting the pair to only one heat treatment in the air. Thus, the present invention serves to widen the range of application of ceramics in industry.

Now, this invention will be described specifically with reference to working examples. It should be noted that this invention is not limited to these examples.

EXAMPLE 1

A mixture of 8 g of a CuS powder, 1 g of an $SiO_2$ powder and 1 g of an $LaCrO_3$ powder was kneaded with 1 cc of a printing ink to produce a paste. This paste was uniformly spread on a plate of reaction sintered $Si_3N_4$ 2 cm in length and 2 cm in width (75% in relative density, made by Nippon Chemical Ceramics Co., Ltd.) and the coat of the paste thus formed was uniformly dusted with 0.5 g of powdered metallic copper. Another $Si_3N_4$ plate of the same size was placed on the coat of paste. The two plates containing the interposed layer of the paste were heated in an electric furnace at 1200° C. for 10 minutes.

The best pieces thus obtained were tested for bending strength in the surface of adhesion. The bending strength was found to be about 500 kg/cm$^2$. In some test pieces, the $Si_3N_4$ plates sustained breakage and the surfaces of adhesion remained unpeeled.

EXAMPLE 2

The procedure of Example 3 was repeated, except that MgO plates 99.5% in purity (made by Nippon Chemical Ceramics Co., Ltd.) were used in the place of $Si_3N_4$ plates. A test showed the joined pair to possess bending strength of about 490 kg/cm$^2$ in the surface of adhesion.

EXAMPLE 3

A mixture of 8 g of a CuS powder, 1 g of an $SiO_2$ powder and 1 g of an $LaCrO_3$ powder was kneaded with 1 cc of a printing ink to produce a paste. This paste was uniformly spread on a plate of reaction sintered $Al_2O_3$ 2 cm in length and 2 cm in width. 0.5 g of a metallic copper powder having a pulverization degree of 5μ was uniformly spread on the coat of paste and another $Al_2O_3$ plate of the same size was placed on the coat of metallic copper powder. The two plates containing the interposed layer consisting of the paste and the metallic copper powder were heated in an electric furnace at 1200° C. for 10 minutes.

The test piece thus obtained was tested for adhesive strength. The adhesive strength was found to be 510 kg/cm$^2$.

The test piece obtained in consequence of the heat treatment at the same temperature for 20 minutes was found to have adhesive strength of 520 kg/cm$^2$.

What is claimed is:

1. A method for the adhesion of two ceramic articles, which comprises interposing between the opposed surfaces of the two ceramic articles a powder mixture of $CuS-LaCrO_3-SiO_2-Cu$ wherein the proportion of CuS to $LaCrO_3-SiO_2$ is in the range of from 80:20 to 90:20 by weight and the proportion of $LaCrO_3$ to $SiO_2$ is in the range of from 25:75 to 50:50 by weight, pressing the two ceramic articles into fast contact with each other across the interposed layer of powder mixture, and heating these two ceramic articles in the resultant state of fast contact in an oxidizing atmosphere at a temperature in the range of from 1000° to 1200° C. for a period of from 10 to 20 minutes.

2. A method for the adhesion of two ceramic articles, which comprises interposing between opposed surfaces of the two ceramic articles a paste consisting of a binder and a powder mixture of $CuS-LaCrO_3-SiO_2-Cu$, wherein the proportion of CuS to $LaCrO_3-SiO_2$ is in the range of 80:20 to 90:10, by weight, and the proportion of $LaCrO_3$ to $SiO_2$ is in the range of 25:75 to 50:50, by weight, pressing the opposed surfaces against each other, with the paste interposed therebetween, and heating the articles in the resultant state of fast contact in an oxidizing atmosphere at a temperature in the range of 1000° to 1200° C. for a period of 10 to 20 minutes.

3. A method for the adhesion of two ceramic articles, which comprises coating a surface of one of the articles with a paste consisting of a binder and a powder mixture of $CuS-LaCrO_3-SiO_2$, wherein the proportion of CuS to $LaCrO_3-SiO_2$ is in the range of 80:20 to 90:10, by weight, and the proportion of $LaCrO_3$ to $SiO_2$ is in the range of 25:75 to 50:50, by weight, dusting the surface coated with the paste uniformly with powdered copper, placing a surface of the other article into contact with the coated surface of the one article, and heating the articles in the resultant state of fast contact in an oxidizing atmosphere at a temperature in the range of 1000° to 1200° C. for a period of 10 to 20 minutes.

4. The method according to claim 1 or 2 or 3, wherein the oxidizing atmosphere is air.

5. The method according to claim 2 or 3, wherein the binder is printing ink.

6. The method according to claim 3, wherein the amount of powdered copper applied by dusting to the coated surface falls in the range of from 0.1 to 0.3 g per cm$^2$ of the surface.

* * * * *